US010375700B1

(12) United States Patent
Toy

(10) Patent No.: US 10,375,700 B1
(45) Date of Patent: Aug. 6, 2019

(54) RESOURCE ALLOCATION FOR VIRTUAL DEVICES

(71) Applicant: Verizon Patent and Licensing Inc., Arlington, VA (US)

(72) Inventor: Mehmet Toy, Allendale, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/957,311

(22) Filed: Apr. 19, 2018

(51) Int. Cl.
| *H04W 72/08* | (2009.01) |
| *H04L 12/26* | (2006.01) |
| *H04W 4/50* | (2018.01) |
| *H04W 72/12* | (2009.01) |
| *H04W 28/02* | (2009.01) |
| *H04W 28/08* | (2009.01) |
| *H04W 72/04* | (2009.01) |

(52) U.S. Cl.
CPC ......... *H04W 72/08* (2013.01); *H04L 43/0829* (2013.01); *H04L 43/0882* (2013.01); *H04W 4/50* (2018.02); *H04W 28/0242* (2013.01); *H04W 28/08* (2013.01); *H04W 72/0486* (2013.01); *H04W 72/1252* (2013.01)

(58) Field of Classification Search
CPC ........... H04W 12/00; H04W 12/00401; H04W 16/08; H04W 28/0242; H04W 28/08; H04W 72/0486; H04W 72/1252; H04W 4/06; H04W 4/20; H04W 4/203; H04W 4/50; H04W 4/60; H04W 4/70; H04W 4/80; H04W 4/90; H04W 8/18; H04W 12/0023; H04W 12/00409; H04W 48/18; H04W 72/005; H04W 72/08; H04L 43/0829; H04L 43/0835; H04L 43/0841
See application file for complete search history.

(56) References Cited

U.S. PATENT DOCUMENTS

2015/0326535 A1* 11/2015 Rao ...................... H04L 41/5054
726/15
2017/0208019 A1* 7/2017 Shimojou ........... H04L 12/4641

* cited by examiner

*Primary Examiner* — Ashley Shivers

(57) ABSTRACT

A method, a device, and a non-transitory storage medium are described in which a resource allocation service is provided in relation to a virtual device. The resource allocation service calculates an allocation of a shared processor and a shared memory in support of the virtual device based on whether packet loss is permitted or not. The calculation of the processor allocated to the virtual device may be based on buffer memory allocation. Alternatively, the calculation of the processor allocated to the virtual device may be based on a packet loss ratio and a buffer memory allocation.

20 Claims, 14 Drawing Sheets

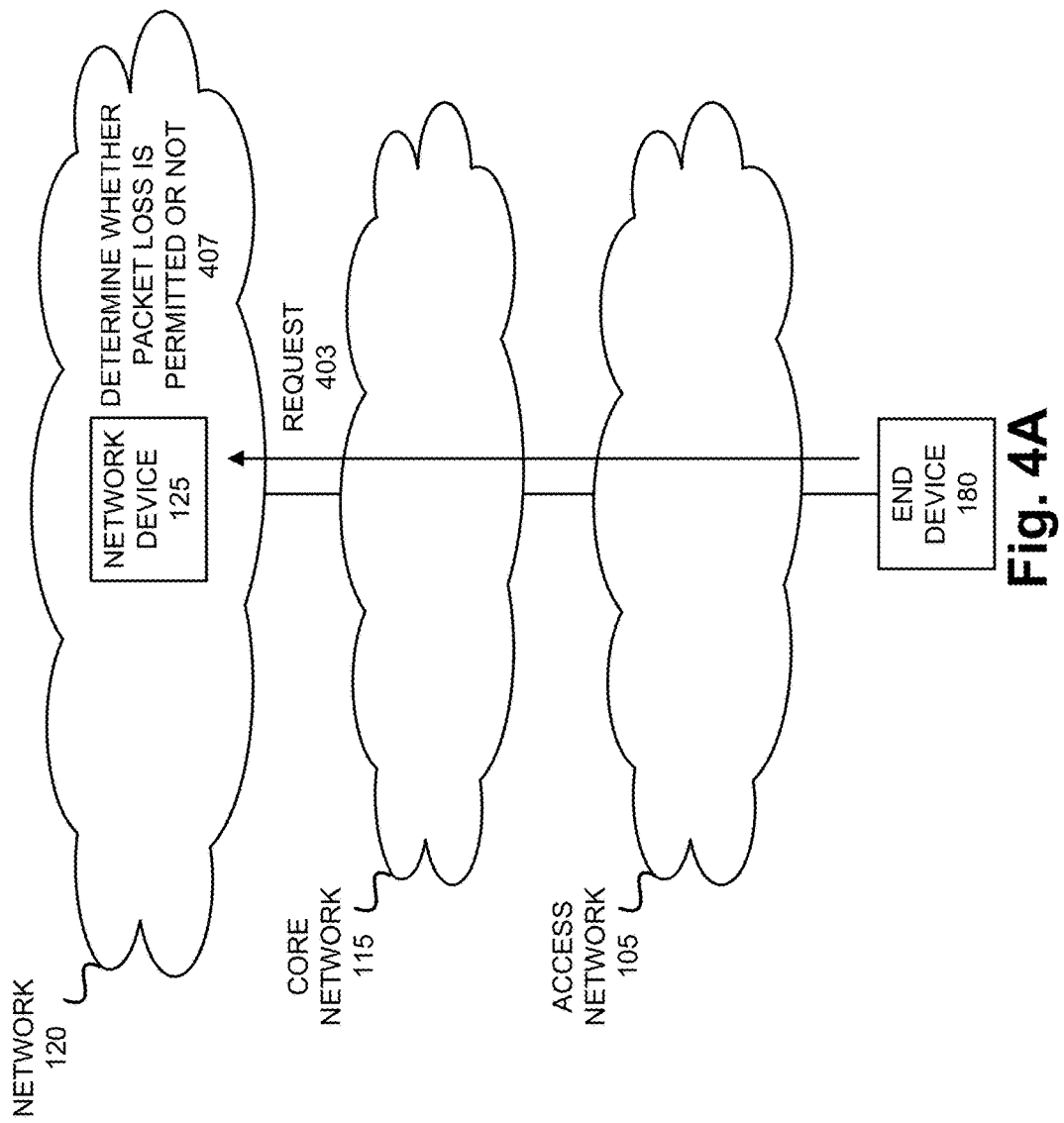

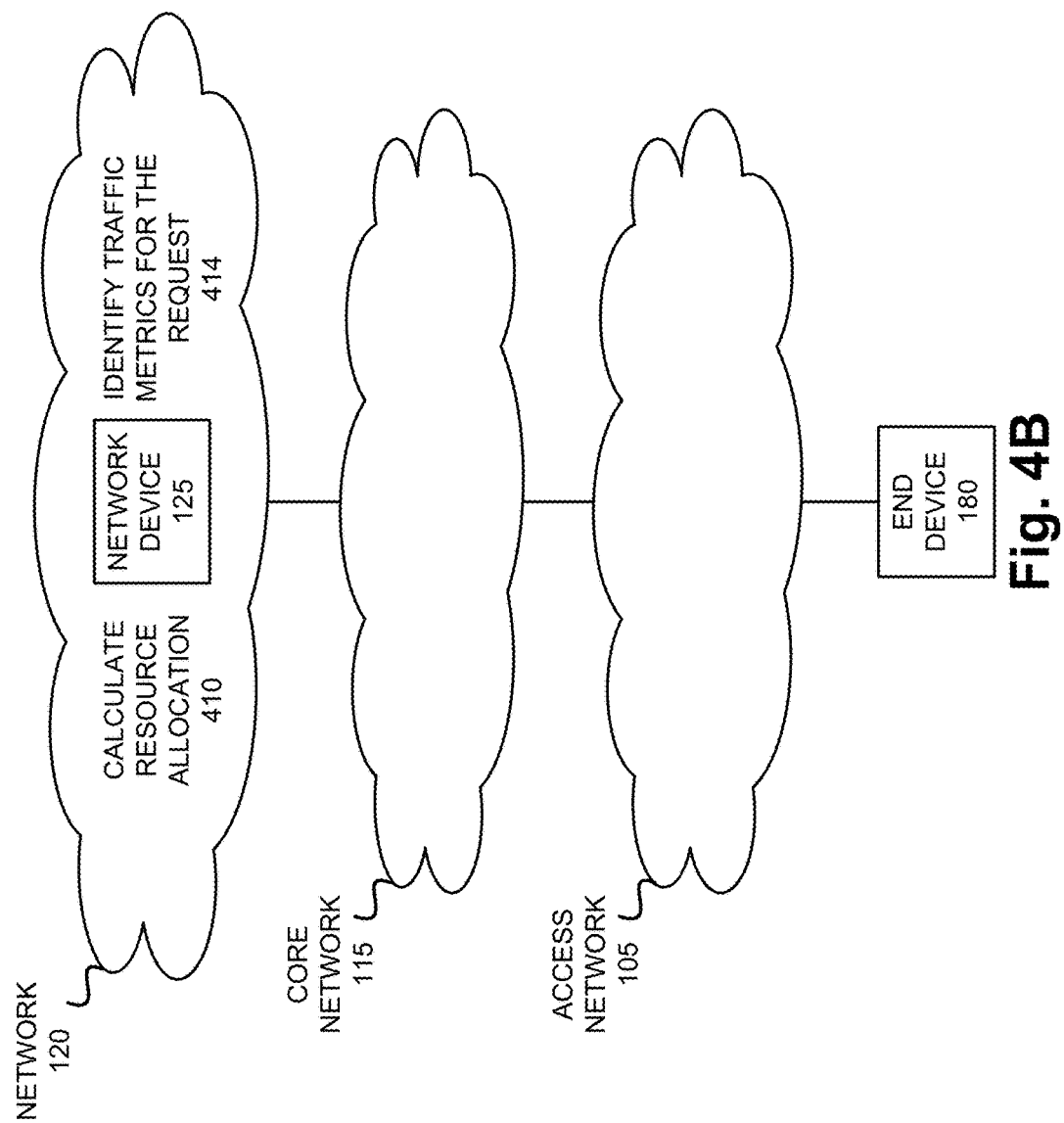

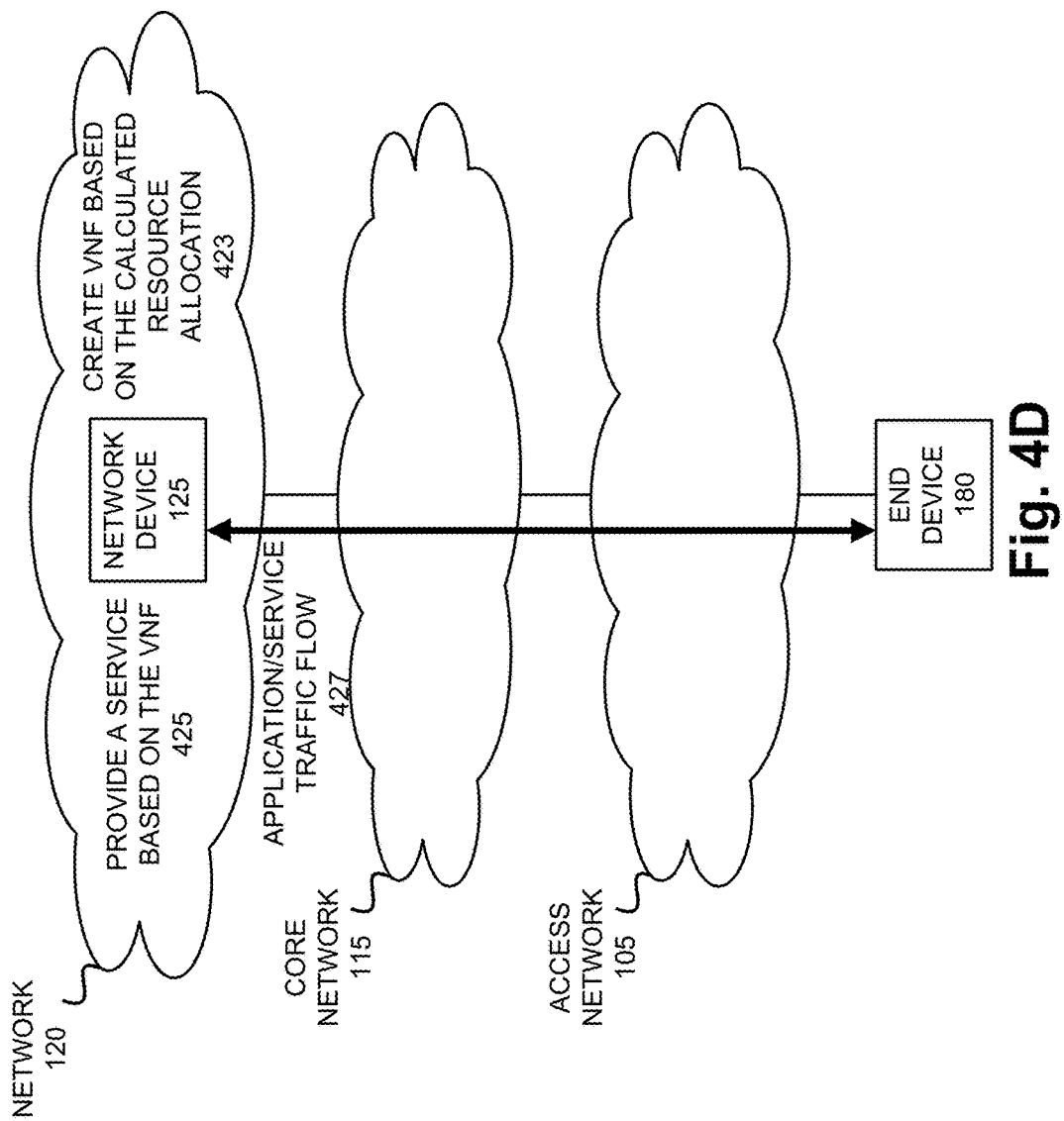

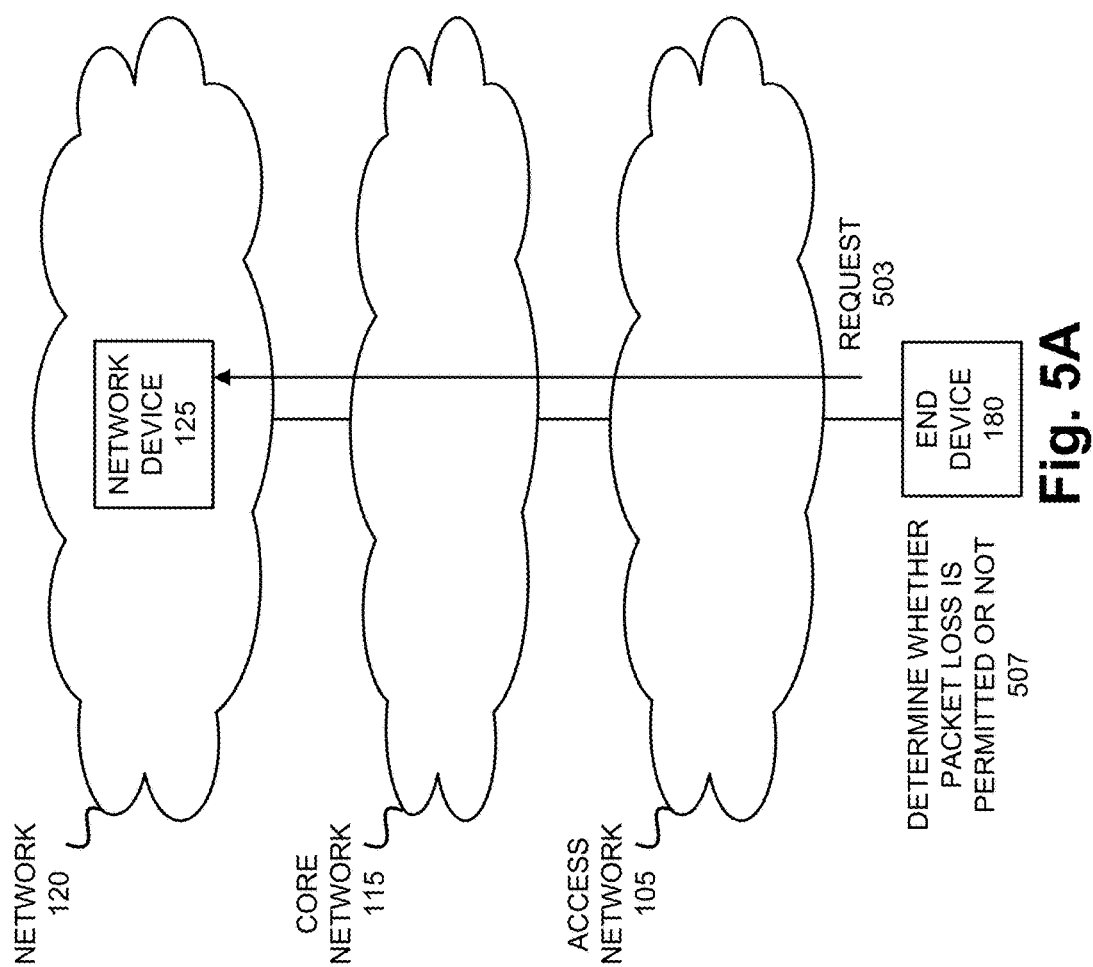

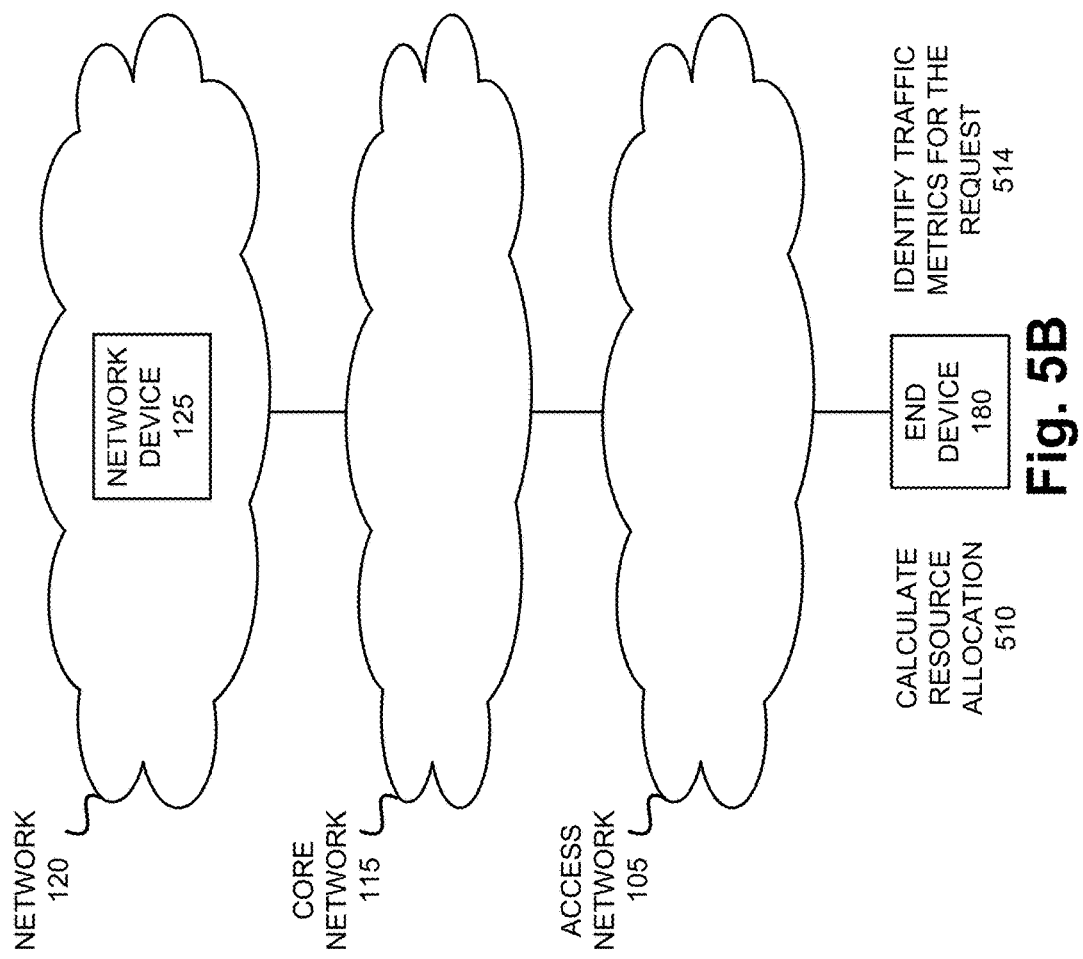

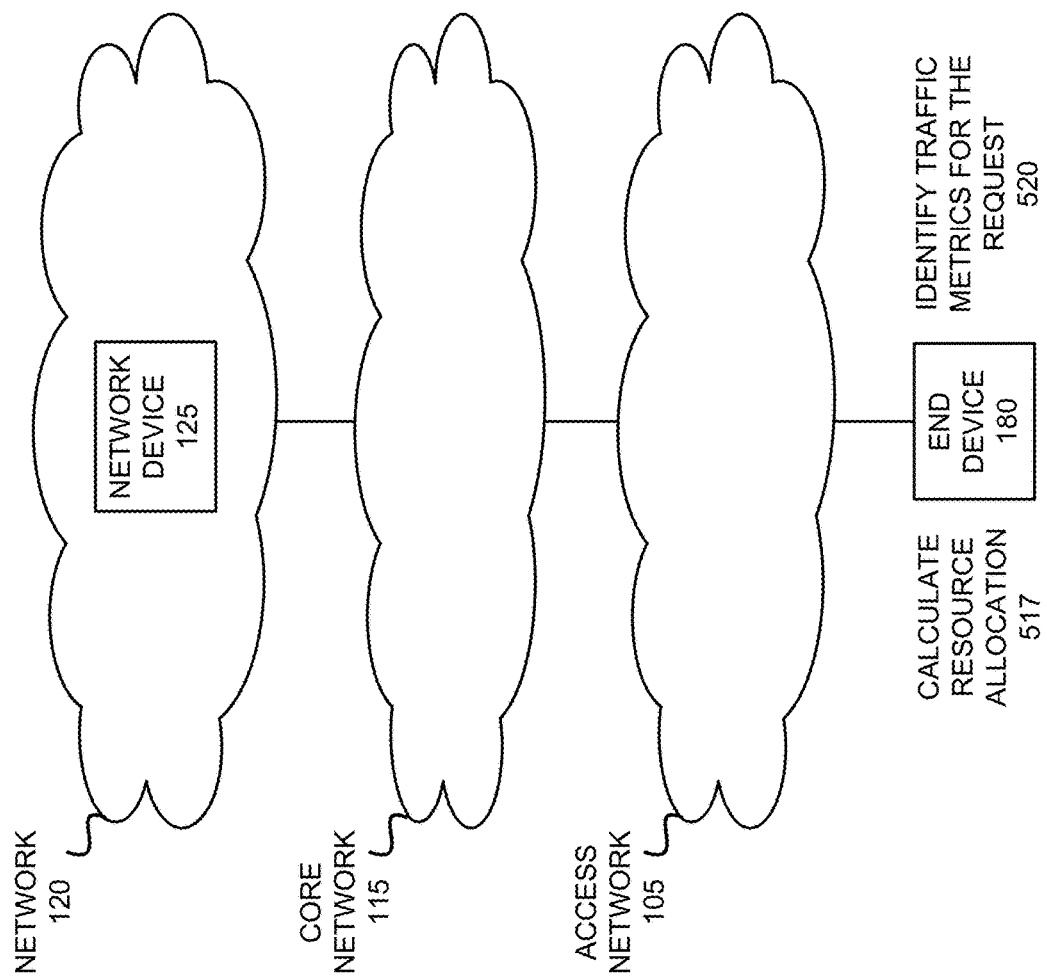

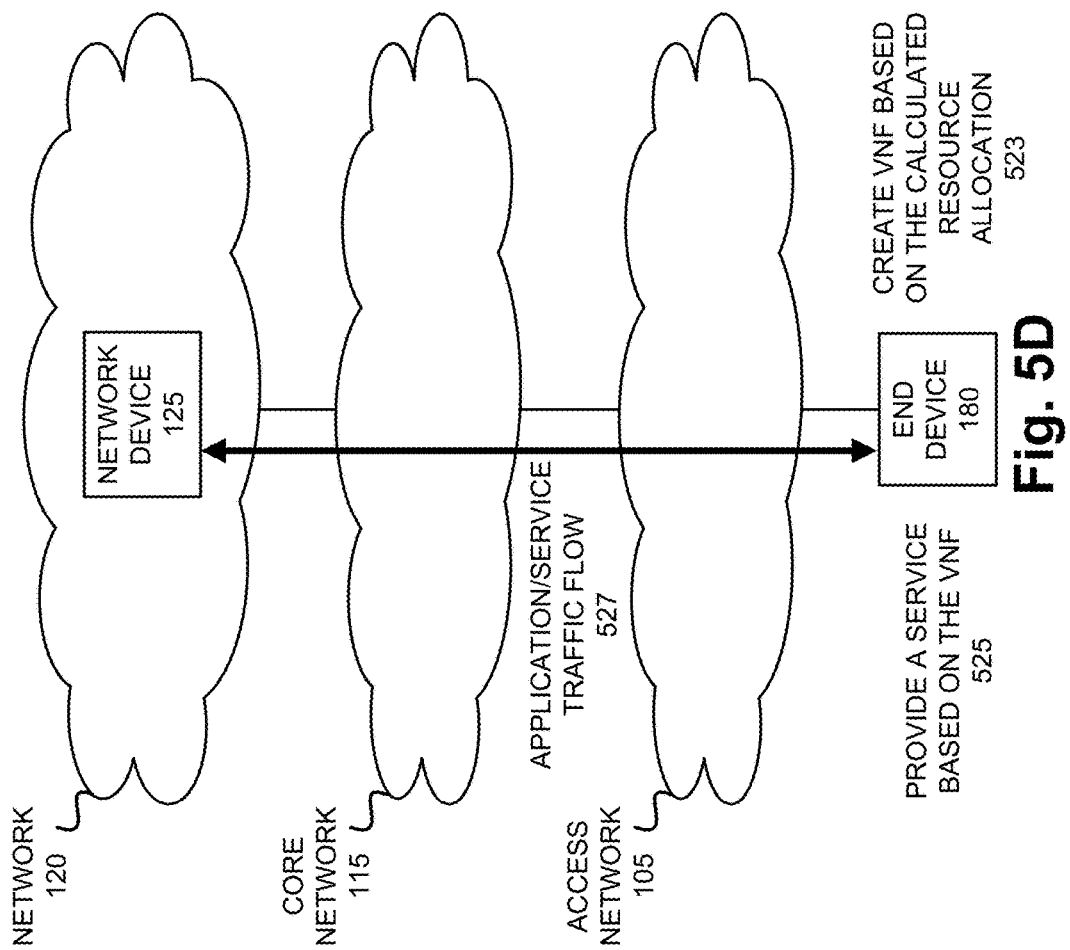

RESOURCE ALLOCATION FOR VIRTUAL DEVICES

BACKGROUND

The development and design of future networks including wireless networks (e.g., Fifth Generation (5G) networks, etc.) is currently underway by various organizations, service providers, and so forth. For example, the development and design of future networks may be based on cloud technologies, software defined networking (SDN), and network function virtualization (NFV).

BRIEF DESCRIPTION OF THE DRAWINGS

FIGS. 4A-4D are diagrams illustrating an exemplary process of an exemplary embodiment of the resource allocation service;

FIGS. 5A-5D are diagrams illustrating another exemplary process of an exemplary embodiment of the resource allocation service;

DETAILED DESCRIPTION OF PREFERRED EMBODIMENTS

Figure 1:
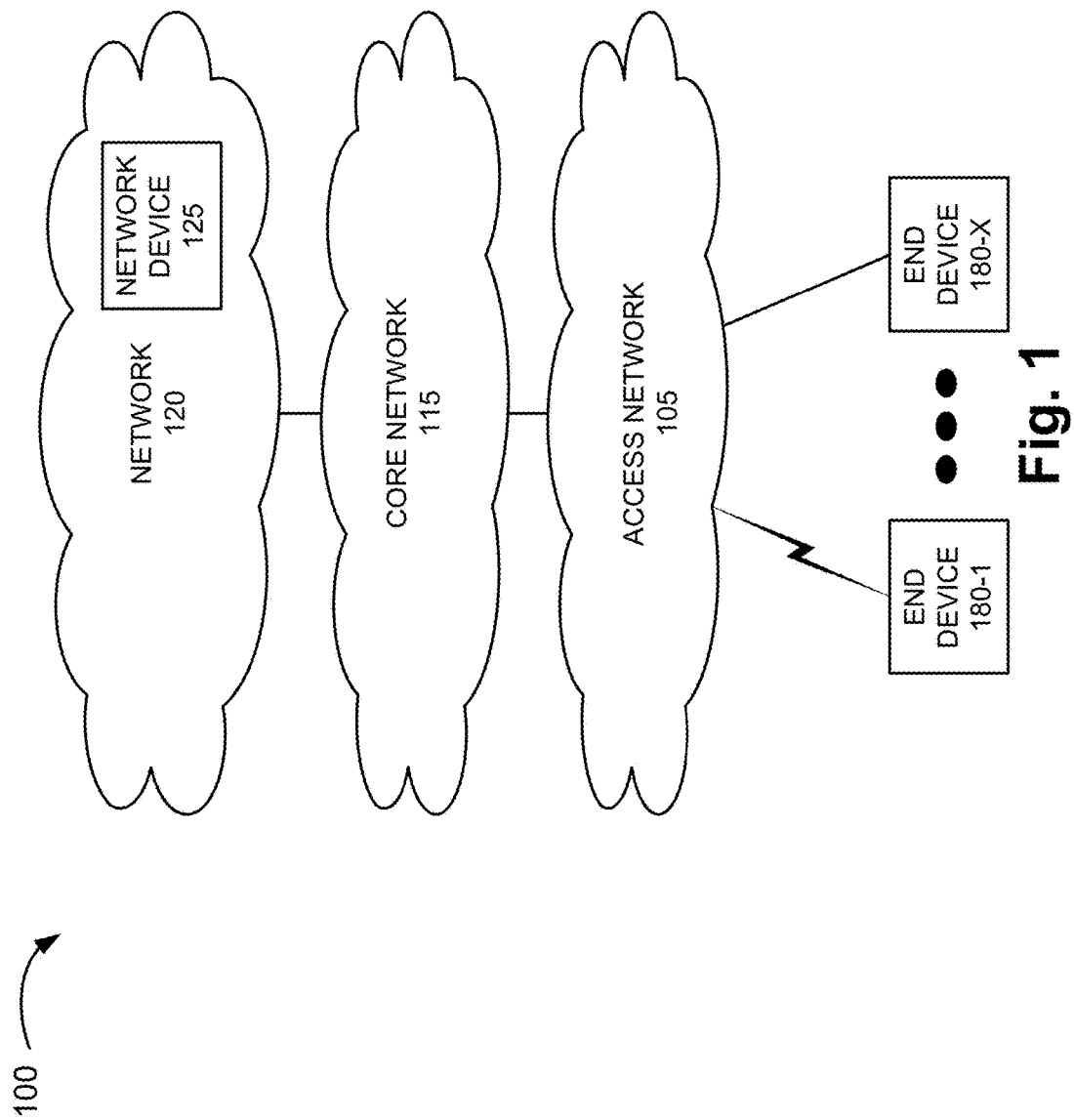
FIG. 1 is a diagram illustrating an exemplary environment in which an exemplary embodiment of a resource allocation service may be implemented.

The following detailed description refers to the accompanying drawings. The same reference numbers in different drawings may identify the same or similar elements. Also, the following detailed description does not limit the invention.

The sharing of a physical resource, such as, for example, a central processing unit (CPU) or other type of processor, by a virtualized system, is one approach to allocating the physical resource in a virtualized environment. For example, the sharing of a CPU among virtual network functions (VNFs) in a network device (e.g., a virtual cloud platform (VCP)) may be implemented. For example, if there are N cycles of CPU during a time interval T, one or more CPU cycles (e.g., n cycles) can be allocated for a given VNF during the time interval T. Based on the VNF load, the number of CPU cycles n (e.g., the number of vCPUs) for the given VNF may be increased (e.g., scaling-out) or decreased (e.g., scaling-in). ¶

Unfortunately, under current approaches, the allocation of the number of vCPUs (e.g., CPU cycles) for a given VNF is independent from the allocation of other physical resources. For example, the allocation of the number of vCPUs for a given VNF is independent from the allocation of memory (e.g., random access memory (RAM) or other type of memory used as a buffer for traffic (e.g., packets)). As a result, such an approach can lead to inefficient use of various resources (e.g., physical, logical, virtual) associated with the VNF and/or other type of virtualized system. For example, the virtualized system may be subject to degradation in throughput, processing of a traffic flow, provisioning of a service, congestion, and so forth.

According to an exemplary embodiment, a load of a virtualized system may be categorized as a committed load and a peak load in which physical resources may be allocated for each category of load. According to other exemplary embodiments, a load of a virtualized system may be categorized differently (e.g., guaranteed, etc.). According to an exemplary embodiment, the physical resources are processor and memory (e.g., buffer). According to other exemplary embodiments, the physical resources may include additional and/or different types of physical resources (e.g., storage, cache, transmitter, receiver, etc.). According to an exemplary embodiment, the allocation of physical resources may be allocated based on whether packet loss is permitted or not. For example, the number of vCPUs and memory size may be calculated based on the committed load and the peak load in which packet loss may be permitted. Alternatively, the number of vCPUs and memory size may be calculated based on the committed load and the peak load in which packet loss may not be permitted.

According to an exemplary embodiment, a committed number of vCPUs for an aggregate flow ($N_c^{AF}$) may be calculated and allocated to a virtual entity in support of an aggregate flow (AF) based on the following exemplary expression:

$$N_c^{AF} = \sum_{n=1}^{k} N_{c,n}^{F}, \qquad (1)$$

in which a committed number of vCPUs ($N_c$) for each flow ($N_{c,n}^{F}$), which pertains to the aggregate flow, may be calculated and summed.

For purposes of description, according to an exemplary implementation, committed number of vCPUs may represent an average number of vCPUs. According to other exemplary implementations, committed number of vCPUs may represent a minimum number of vCPUs or some other metric (e.g., guaranteed number of vCPUs). In the context of a traffic flow, a committed information rate (CIR) may represent, for example, an average bit rate or a minimum bit rate, and a committed burst size (CBS) may represent a memory size (e.g., a buffer size) that supports the CIR. Additionally, in the context of a traffic flow, a peak information rate (PIR) (or peak rate (PR)) may represent, for example, a maximum bit rate. According to various exemplary implementations, the aggregate flow may pertain to a single virtual entity (e.g., a single VNF, etc.) that supports multiple traffic flows in the incoming and outgoing directions or multiple virtual entities (e.g., multiple VNFs, etc.) that support multiple traffic flows.

According to an exemplary embodiment, a committed memory size for an aggregate flow ($M_c^{AF}$) may be calculated and allocated to a virtual entity in support of the aggregate flow based on the following expression:

$$M_c^{AF} \leq \sum_{n=1}^{k} M_{c,n}^{F}, \qquad (2)$$

in which a committed memory ($M_c$) for each flow ($M_{c,n}^F$), which pertains to the aggregate flow, may be calculated and summed. For purposes of description, according to an exemplary implementation, committed memory size may represent an average memory size. According to other exemplary implementations, committed memory size may represent a minimum memory size or some other metric. In the context of a traffic flow, an excessive burst size (EBS) may represent a buffer size that supports an excess bit rate that is the difference between a CIR and a PIR.

According to an exemplary embodiment, an excess number of vCPUs for an aggregate flow ($N_e^{AF}$) may be calculated and allocated to a virtual entity in support of the aggregate flow based on the following expression:

$$N_e^{AF} = \sum_{n=1}^{k} N_{e,n}^F, \qquad (3)$$

in which an excess number of vCPUs ($N_e$) for each flow ($N_{e,n}^F$), which pertains to the aggregate flow, may be calculated and summed.

According an exemplary embodiment, an excess memory size for aggregate flow ($M_e^{AF}$) may be calculated and allocated to a virtual entity in support of the aggregate flow based on the following expression:

$$M_e^{AF} \leq \sum_{n=1}^{k} M_{e,n}^F, \qquad (4)$$

in which excess memory size ($M_e$) for each flow ($M_{e,n}^F$), which pertains to the aggregate flow, may be calculated and summed.

In the context of traffic flow, the excess number of vCPUs may support an excess bit rate, which is the difference between the CIR and the PIR, and the excess memory size may support an EBS.

According to an exemplary embodiment, a total number of vCPUs for the aggregate flow ($N_t^{AF}$) may be calculated based on the following expression:

$$N_t^{AF} = \sum_{n=1}^{k} N_{c,n}^F + \sum_{n=1}^{k} N_{e,n}^F. \qquad (5)$$

According to an exemplary embodiment, a total memory size for the aggregate flow ($M_t^{AF}$) may be calculated based on the following expression:

$$M_t^{AF} \leq \sum_{n=1}^{k} M_{c,n}^F + \sum_{n=1}^{k} M_{e,n}^F. \qquad (6)$$

According to this embodiment, the resource allocation service may not permit statistical multiplexing for the aggregate traffic flow.

Instead of calculating the number of vCPUs as in expression (5), an effective number of vCPU may be calculated in a manner that takes buffer memory into account. For example, according to another exemplary embodiment, an effective number of vCPUs and buffer memory size may be calculated based on a committed load and a peak load in which packet loss may not be permitted. For example, various types of traffic flows or other network-based entities, such as a Virtual Private Network (VPN), Class-of-Service (CoS), an Ethernet Virtual Connection (EVC) supporting packet loss sensitive applications, may be associated with a no loss metric under a service level agreement (SLA). According to an exemplary embodiment, the effective number of vCPUs for a given traffic flow ($N_{\mathit{eff}}^F$) may be calculated based on the following exemplary expression:

$$N_{\mathit{eff}}^F = \max\left(N_c, \frac{N_m}{1 + \frac{(\max(\mathit{memory}_{A-Z}, \mathit{memory}_{Z-A}) * N_m)}{M_m}}\right), \qquad (7)$$

in which $N_m = N_c + N_e$, where $N_m$ represents a maximum number of vCPUs; $\mathit{memory}_{A-Z}$=memory size for the traffic flow in the A to Z direction (e.g., upstream, inbound, etc.); and $\mathit{memory}_{Z-A}$=memory size for the traffic flow in the Z to A direction (e.g., downstream, outbound, etc.)); and $M_m$ represents the memory size to handle traffic load at the peak rate. The ratio of "memory size for a given instance of traffic load" to "$M_m$" is equal to the ratio "bit rate of the traffic load for the same instance" to "peak rate". With this assumption, expression (7) represents a relationship between memory size and number of vCPUs without packet loss: If memory reaches to 1 packet size, then the number of vCPUs becomes $N_m$. For a given memory size (i.e. maximum size memory required to handle traffic load in both directions of a flow), the second term in expression (7) (e.g.

$$\left(e.g., \frac{N_m}{1 + \frac{(\max(\mathit{memory}_{A-Z}, \mathit{memory}_{Z-A}) * N_m)}{M_m}}\right)$$

calculates a required number of vCPUs without packet loss. The effective number of vCPUs is the maximum value of both the first term (e.g., $N_c$) and the second term in expression (7).

According to an exemplary embodiment, the effective number of vCPUs for the aggregate flow ($N_{\mathit{eff}}^{AF}$), which allows statistical multiplexing, may be calculated based on the following exemplary expression:

$$N_{\mathit{eff}}^{AF} = \sum_{n=1}^{N} N_{\mathit{eff},n}^F, \qquad (8)$$

in which the effective number of vCPUs for each flow, which pertains to the aggregate flow, as calculated in exemplary expression (7), may be calculated and summed for the aggregate flow.

Another approach for calculating $N_{\mathit{eff}}^{AF}$ is to take both memory and PLR, that is defined by Class of Service (i.e. Service Level Agreement-SLA) of a given application (i.e. VNF), into account. For example, a single flow has a variable bit rate bounded by a physical interface of a VNF residing in a compute node with one or more CPUs. In order to represent traffic associated with a flow, a two-state fluid model is chosen where a traffic source is either in an "off state" transmitting nothing or in an "on state" transmitting at its peak rate, and utilizing $N_m$ number of vCPUs. The equivalent CPU capacity (i.e. number of vCPUs) for a set of flows multiplexed in a VNF interface is defined as the number of vCPUs required to achieve a desired Class of Service defined by a packet loss ratio (i.e. memory overflow probability), PLR, for the given application with offered aggregate bit rate.

The equivalent CPU capacity is approximated by a fluid-flow model where the traffic load generated by a number of multiplexed flows are represented as a continuous flow of bits with intensity varying according to the state of an underlying continuous-time Markov chain. This Markov chain is obtained from the superposition of the sources associated with each flow. The equivalent CPU capacity (i.e. effective number of vCPUs) per flow can be calculated as described in exemplary expressions (9), (10), and (11).

$$N_{eff}^F = \max(N_c, N_m * \alpha) \quad (9),$$

in which $\alpha$ may be calculated based on the following exemplary expression:

$$\alpha = \frac{(\beta - M) + \sqrt{(\beta - M)^2 + 4\frac{N_c}{N_m}\beta * M}}{2\beta}, \quad (10)$$

in which M=memory, wherein the M is the committed memory ($M_c$) and the excess memory ($M_e$); and $$\beta = \left(\ln\frac{1}{PLR}\right) * \left(\frac{M_m}{N_m}\right) * \left(\frac{1 - N_c}{N_m}\right)N_m, \quad (11)$$

in which PLR=a packet or a frame loss ratio that is allowed per a service level agreement.

Table 1 below illustrates exemplary values and resulting resource savings based on expression (7).

TABLE 1

| $N_c$ | $N_e$ | $N_m$ | $M_m$ (GB) | mem$_{A-Z}$ (GB) | mem$_{Z-A}$ (GB) | $N_{eff}$ | % Saving |
|---|---|---|---|---|---|---|---|
| 4 | 4 | 8 | 0.2 | 0.1 | 0.1 | 5 | 37.50 |
| 4 | 4 | 8 | 0.25 | 0.1 | 0.1 | 4.20 | 47.50 |
| 4 | 4 | 8 | 0.15 | 0.1 | 0.1 | 6.33 | 20.83 |
| 4 | 4 | 8 | 0.12 | 0.1 | 0.1 | 7.67 | 4.17 |
| 8 | 8 | 16 | 0.02 | 0.01 | 0.01 | 9.00 | 43.75 |
| 16 | 16 | 32 | 0.02 | 0.01 | 0.01 | 17.00 | 46.88 |

Table 2 below illustrates exemplary values and resulting resource savings based on expression (9).

TABLE 2

| $N_c$ | $N_e$ | $N_m$ | $M_m$ (GB) | PLR | M (GB) | $N_{eff}$ | % Saving |
|---|---|---|---|---|---|---|---|
| 4 | 4 | 8 | 0.2 | 0.02 | 0.1 | 6.46 | 19.27 |
| 4 | 4 | 8 | 0.2 | 0.01 | 0.1 | 6.98 | 12.78 |
| 4 | 4 | 8 | 0.25 | 0.01 | 0.1 | 7.87 | 1.69 |
| 4 | 4 | 8 | 0.15 | 0.01 | 0.1 | 6.13 | 23.41 |
| 8 | 8 | 16 | 0.02 | 0.02 | 0.01 | 8.72 | 45.48 |
| 8 | 8 | 16 | 0.02 | 0.01 | 0.01 | 8.76 | 45.23 |
| 16 | 16 | 32 | 0.02 | 0.01 | 0.01 | 17.53 | 45.23 |
| 16 | 16 | 32 | 0.02 | 0.001 | 0.01 | 18.06 | 43.57 |

Both approaches result in a lower number of vCPUs for $N_{eff}$ compared to the number of vCPUs for $N_m$. It is expected that the number of vCPUs calculated from expression (7) is to be higher than the number of vCPUs calculated from expression (9) for the same values of $N_c$ and memory. This is observed for some examples but not all. As illustrated, the effective number of vCPU approaches can save a substantial amount of physical resources.

FIG. 1 is a diagram illustrating an exemplary environment 100 in which an exemplary embodiment of the resource allocation service may be implemented. As illustrated, environment 100 includes an access network 105, a core network 115, and a network 120 that includes a network device 125. Environment 100 also includes end devices 180-1 through 180-X (also referred to collectively as end devices 180 and, individually or generally as end device 180).

According to other embodiments, environment 100 may include additional devices, fewer devices, and/or different types of devices than those illustrated and described herein. For example, a function of a single network device may be implemented by multiple devices, and/or functions of multiple network devices may be implemented by a single network device. In this regard, the number, type, and/or arrangement of network devices (also known as network elements or network functions) in environment 100 are exemplary. A network device, a network element, or a network function (referred to herein simply as a network device) may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, a cloud device, a virtualized function, etc). According to other exemplary embodiments, environment 100 may include additional networks, fewer networks, and/or different networks than those illustrated and described herein.

Environment 100 includes communication links. Environment 100 may be implemented to include wired, optical, and/or wireless communication links among networks, network devices, and end devices, as illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

Access network 105 includes one or multiple networks of one or multiple types and technologies. According to an exemplary implementation, access network 105 may include a 4G radio access network (RAN) (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), and a future or next generation RAN (e.g., a 5G-access network (5G-AN) or a 5G-RAN (referred to herein as simply a 5G-RAN)). According to other exemplary implementations, access network 105 may include other types of RANs (e.g., a Third Generation (3G) RAN, a 3.5G RAN, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, and/or an Evolution Data Optimized (EV-DO) RAN). According to other exemplary implementations, access network 105 may include a wired network and/or an optical network.

Access network 105 may communicate with other types of access networks, such as, for example, a WiFi network, a Worldwide Interoperability for Microwave Access (Wi- MAX) network, a local area network (LAN), a cloud RAN, a wired network (e.g., optical, cable, coaxial, copper, etc.), or other type of network that provides access to or can be used as an on-ramp to access network 105, core network 115 and/or network 120.

Depending on the implementation, access network 105 may include various types of network devices that are not illustrated in FIG. 1. For example, access network 105 may include an evolved Node B (eNB), an eLTE eNB, a next generation Node B (gNB), a base station (BS), a base transceiver station (BTS), a Node B, a remote radio head (RRH), an RRH and a baseband unit (BBU), a BBU, a radio network controller (RNC), a wireless node (e.g., a small cell node (e.g., a picocell device, a femtocell device, a microcell device, a home eNB, a repeater, etc.)), or other type of network device (e.g., a gateway, a router, a switch, etc.) for IP/MPLS, Carrier Ethernet, and SD-WAN overlay networks Core network 115 includes one or multiple networks of one or multiple types and technologies. According to an exemplary implementation, core network 115 includes a complementary network pertaining to the one or multiple RANs described. For example, core network 115 may include the core part of an LTE network, an LTE-A network, and/or a next generation core network (NGC). According to other exemplary implementations, core network 115 includes a complementary network pertaining to other types of access networks (e.g., wired, optical, etc.) such as IP/MPLS, Carrier Ethernet and SD-WAN overlay networks Depending on the implementation, core network 115 may include various network devices, such as a gateway, a mobility management entity (MME), a user plane function (UPF), a packet data network gateway (PGW), a serving gateway (SGW), a session management function (SMF), as well other network devices pertaining to various network-related functions, such as billing, security, authentication and authorization, network polices, subscriber profiles, and/or other network devices that facilitate the operation of core network 115.

Network 120 includes one or multiple networks of one or multiple types and technologies. According to an exemplary embodiment, network 120 provides access for an application and/or a service to end device 180. For example, network 120 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, a service provider network, or other type of network that hosts an application or a service. For example, the end device application/service network may provide various applications/services pertaining to broadband access in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), life-line communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

According to an exemplary embodiment, network device 125 of network 120, which provides the application and/or service, is a virtualized network device that includes the resource allocation service, as described herein. Depending on the implementation, network device 125 may include various types of network devices that provide various applications, services, or other type of end device assets, such as servers (e.g., web, application, cloud, etc.), mass storage devices, data center devices, and/or other types of network devices configured to provide the application and/or service. The virtualization of network device 125 may be implemented based on a virtual container-based environment, a virtual machine, a hypervisor, and/or other virtualization technologies.

End device 180 includes a device that has computational, storage and communication capabilities. End device 180 may be implemented as a mobile device, a portable device, or a stationary device. End device 180 may be implemented as a Mobile Broadband device, a Machine Type Communication (MTC) device, an IoT device, an enhanced MTC device (eMTC) (also known as Cat-M1), a NarrowBand IoT (NB-IoT) device, a user device, customer premise equipment (CPE), a universal CPE (uCPE), a virtual CPE (vCPE), a virtual network demarcation device (vNID), or some other type of end node or intermediary node. By way of further example, end device 180 may be implemented as a smartphone, a personal digital assistant, a tablet, a netbook, a phablet, a wearable device, a set top box, an infotainment system in a vehicle, a vehicle support system, a smart television, a game system, a music playing system, a set top box, a computer, an in-home router, or some other type of end device (e.g., cloud-in-a-box, etc.). According to an exemplary embodiment, end device 180 is a virtualized device that provides the resource allocation service, as described herein. According to various exemplary embodiments, end device 180 may be configured to execute various types of software (e.g., applications, programs, etc.). The number and the types of software may vary among end devices 180.

Figure 2:
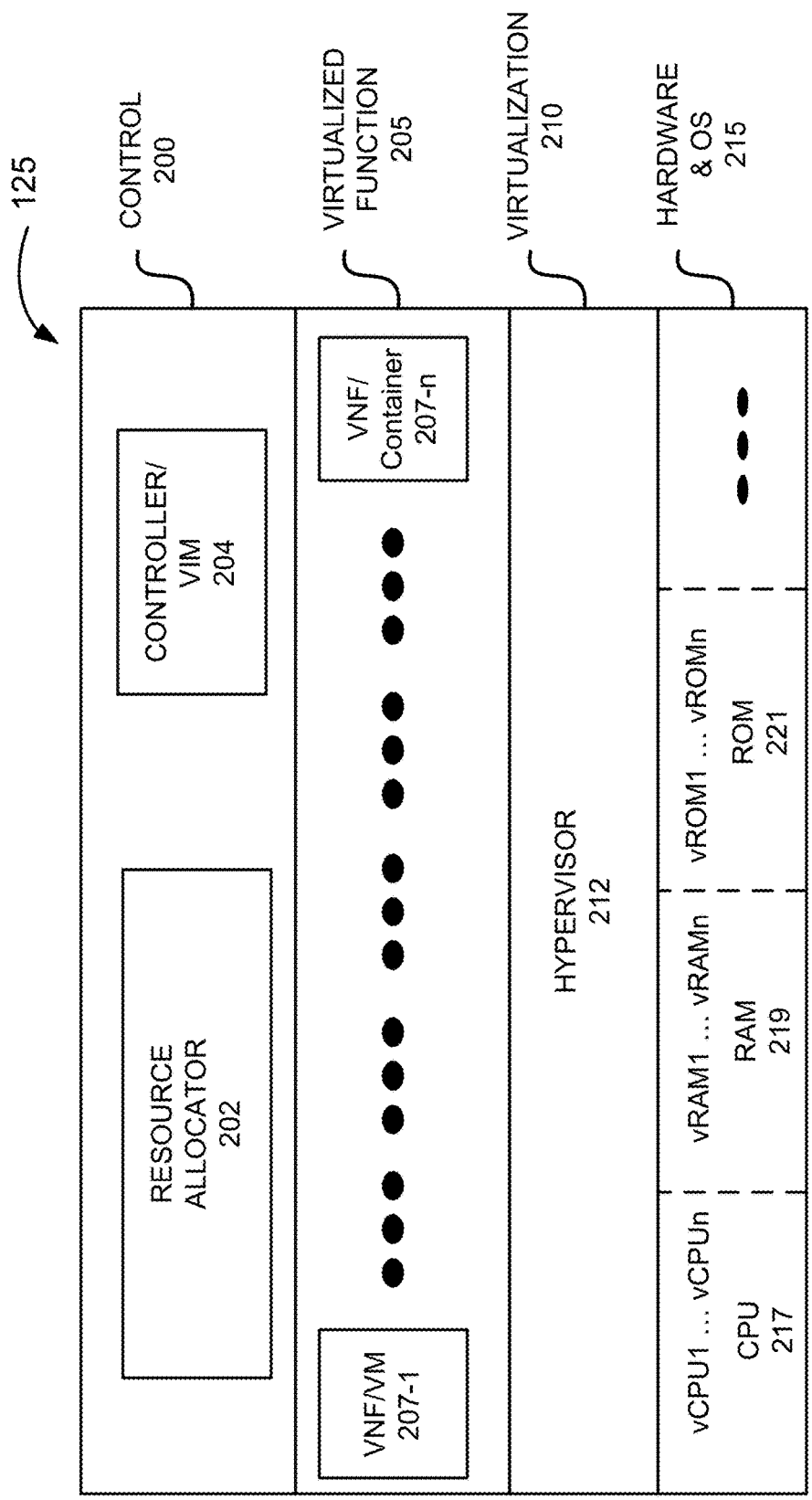
FIGS. 2 and 3 are diagrams illustrating exemplary components of exemplary embodiments of devices that may provide the resource allocation service.

FIG. 2 is a diagram illustrating exemplary components of an exemplary embodiment of a network device that provides the resource allocation service. For example, network device 125 may include the components illustrated in FIG. 2 and described herein. Referring to FIG. 2, network device 125 may include a control layer 200, a virtualized function layer 205, a virtualization layer 210, and a hardware and operating system layer 215. According to other exemplary implementations, network device 125 may include additional, fewer, and/or different layers or functionalities. Additionally, according to other exemplary implementations, network device 125 may include additional, fewer, and/or different components in support of virtualization of network device 125. For example, there are numerous well-known technologies and/or architectures (e.g., VMware, Citrix, Red Hat, Oracle, containers, VMs, etc.) that support the creation, management, deletion, etc., of a virtualized network device, which may be implemented. This description is not intended to provide an exhaustive treatment of such technologies and/or architectures.

As illustrated, control layer 200 may include a resource allocator 202 and a controller/Virtual Infrastructure Manager (VIM) 204. Resource allocator 202 includes logic that provides the resource allocation service. For example, according to various exemplary embodiments, resource allocator 202 may calculate and allocate virtual and physical resources pertaining to a virtual device. By way of example, the virtual device may be implemented to include a VNF/Virtual Machine (VM), a VNF/Container, or another type of virtualized device. For purposes of illustration, VNFs/VMs and/or VMFs/Containers 207-1 through 207-n (also referred to collectively as VNFs/VMs or VNFs/Containers 207) are illustrated in FIG. 2. Resource allocator 202 may use the exemplary expressions (1)-(11), previously described, as a basis to calculate the allocation of virtual and physical resources (e.g., CPU, memory), as well as other parameters (e.g., type of service, type of traffic flow, etc.), as described herein. Resource allocator 202 may include dedicated hardware (e.g., processor, memory, etc.) or hardware/software components that support the logic for providing the resource allocation service. Alternatively, resource allocator 202 may share physical resources that may be also used by a virtualized device (e.g., VNF/VM, VNF/Container, etc.).

Controller 204 may include logic that manages virtual devices based on various services (e.g., networking, security, object storage, orchestration, data management, etc.). For example, controller 204 may be implemented to include an OpenStack controller node or similar entity belonging to a different virtualization technology/architecture. Controller 204 may include underlying hardware awareness functionalities, such as CPU Pinning.

Virtualized function layer 205 may include a virtual device (e.g., VNFs/VMs or VNFs/Containers) that each provides an application and/or a service. For example, as illustrated, network device 125 may include VNFs/VMs or VNFs/Containers or both. Virtualization layer 205 includes logic that facilitates the virtualization of hardware and OS layer 215. For example, virtualization layer 210 may include a hypervisor 212.

Hardware and operating system (OS) layer 215 may include various types of physical resources/hardware, such as for example, a CPU 217, a RAM 219, a read only memory (ROM) 221, Single Root I/O Virtualization and Sharing (SR-IOV), as well as other hardware components not illustrated (e.g., a communication interface that includes a transmitter and a receiver, a storage component (e.g., a hard drive, etc.)), and so forth. Hardware and OS layer 215 may include an operating system. For example, the OS may be implemented by Linux, OpenStack, Windows Server, or other well-known and/or proprietary operating system. As illustrated, virtual CPUs 1 through n, virtual RAM 1 through n, virtual ROM 1 through n, etc., may be allocated in support of the operation of VNFs/VMs/Containers 207 based on the resource allocation service provided by resource allocator 202.

Figure 3:
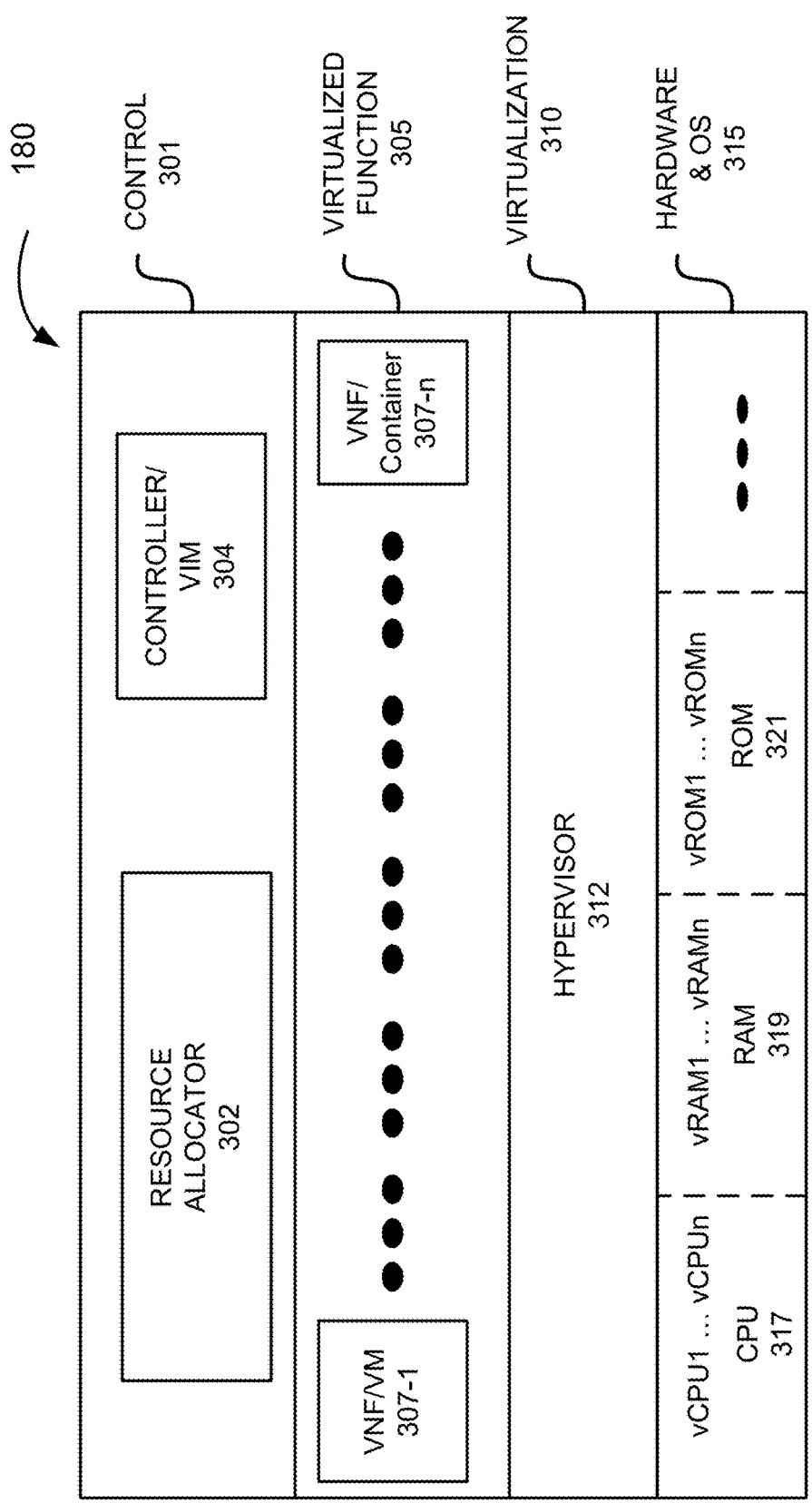

FIG. 3 is a diagram illustrating exemplary components of an exemplary embodiment of an end device that may provide the resource allocation service. For example, end device 180 may include the components illustrated in FIG. 3 and described herein. Referring to FIG. 3, end device 180 may include a control layer 301, a virtualized function layer 305, a virtualization layer 310, and a hardware and operating system layer 315. According to other exemplary implementations, end device 180 may include additional, fewer, and/or different layers or functionalities. Additionally, according to other exemplary implementations, end device 180 may include additional, fewer, and/or different components in support of virtualization of end device 180, as previously described. For example, there are numerous well-known technologies and/or architectures that support the creation, management, deletion, etc., of a virtualized device, which may be implemented, as previously described.

As illustrated, control layer 300 may include a resource allocator 302 and a controller/VIM 304. Resource allocator 302 includes logic that provides the resource allocation service. For example, according to various exemplary embodiments, resource allocator 302 may calculate and allocate virtual and physical resources pertaining to a virtual device. By way of example, the virtual device may be implemented to include a VNF/VM, a VNF/Container, or another type of virtualized device. For purposes of illustrated, VNFs/VMs or VNFs/Containers 307 are illustrated in FIG. 3. Resource allocator 302 may use the exemplary expressions (1)-(11), previously described, as a basis to calculate the allocation of virtual and physical resources (e.g., CPU, memory), as well as other parameters (e.g., type of service, type of traffic flow, etc.), as described herein. Resource allocator 302 may include dedicated hardware (e.g., processor, memory, etc.) or hardware/software components that support the logic for providing the resource allocation service. Alternatively, resource allocator 302 may share physical resources that may be also used by a virtualized device (e.g., VNF/VM, VNF/Container, etc.).

Controller 304 may include logic that manages virtual devices based on various services (e.g., networking, security, object storage, orchestration, data management, etc.). For example, controller 304 may be implemented to include an OpenStack controller node or similar entity belonging to a different virtualization technology/architecture. Controller 304 may include underlying hardware awareness functionalities, such as CPU Pinning.

Virtualized function layer 305 may include a virtual device (e.g., VNFs/VMs or VNFs/Containers) that each provides an application and/or a service. For example, as illustrated, end device 180 may include VNFs/VMs or VNFs/Containers 307 or both. Virtualization layer 310 includes logic that facilitates the virtualization of hardware and OS layer 315. For example, virtualization layer 310 may include a hypervisor 312.

Hardware and operating system (OS) layer 315 may include various types of physical resources/hardware, such as for example, a CPU 317, a RAM 319, a read only memory (ROM) 321, as well as other hardware components not illustrated (e.g., a communication interface that includes a transmitter and a receiver, a storage component (e.g., a hard drive, etc.)), and so forth. Hardware and OS layer 315 may include an operating system. For example, the OS may be implemented by Linux, OpenStack, Windows Server, or other well-known and/or proprietary operating system. As illustrated, virtual CPUs 1 through n, virtual RAM 1 through n, virtual ROM 1 through n, etc., may be allocated in support of the operation of VNFs/VMs/Containers 307 based on the virtual and resource allocation service provided by resource allocator 302.

Although FIGS. 2 and 3 each depicts a component (e.g., resource allocator 202/302) resident on network device 125 and end device 180 that provides the resource allocation service, according to other exemplary embodiments, the resource allocation service may be implemented, entirely or in part, by a device remote from these virtualized devices. For example, a network device, which may be a standalone network device, may provide the resource allocation service remote from the virtualized devices. According to various exemplary implementations, the remote network device may be aware of the total resources of the end device or network device, current use of the resources, values of parameters associated with expressions (1)-(11), and/or other parameters that pertain to the allocation of resources, as described herein.

Figure 4C:
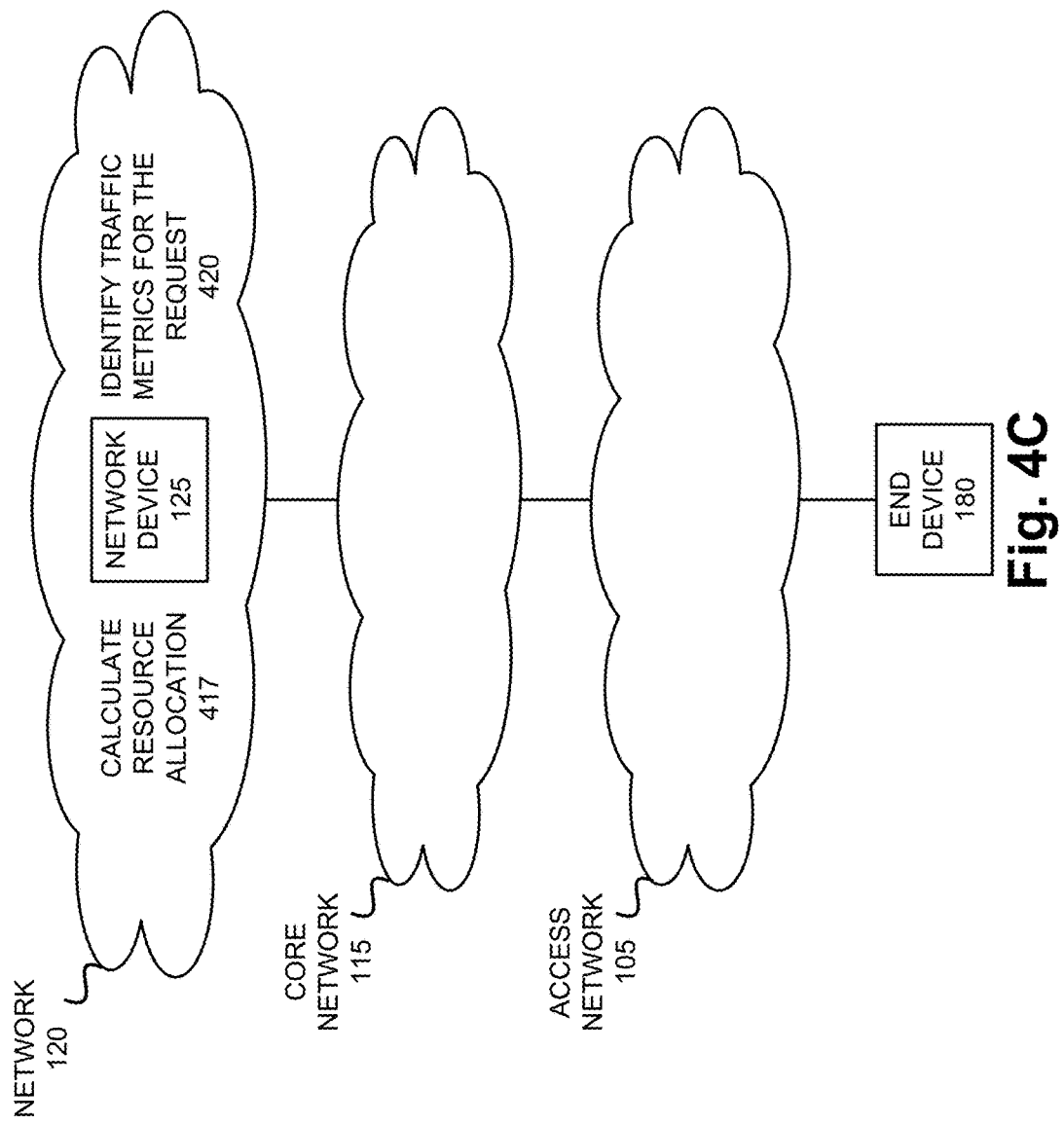

FIGS. 4A-4D are diagrams illustrating an exemplary process of the resource allocation service from a network-side perspective. Referring to FIG. 4A, assume that end device 180 and network device 125 establish a connection. Subsequent to the establishment of the connection, end device 180 may transmit a request 403 to establish a session for an application and/or service offered by network device 125. For example, the application or service may pertain to a video streaming service, a voice service, a critical application, or some other type application/service. In response to receiving the request 403, network device 125 may determine whether packet loss is permitted or not with respect to the request 403.

According to various exemplary embodiments, network device 125 may make this determination based on one or multiple criteria. For example, according to an exemplary implementation, network device 125 may determine whether packet loss is permitted or not based on the type of application or service requested. For example, when the type of application/service is a critical application/service, network device 125 may determine that packet loss is not permitted. Alternatively, when the type of application/service is a non-critical application/service, network device 125 may determine the level of packet loss permitted.

According to another exemplary implementation, network device 125 may determine whether packet loss is permitted or not based on parameters of an SLA associated with end device 180. For example, the parameters and parameter values (parameters/values) may pertain to quality-of-service (QoS), network performance metrics, and/or a CoS. By way of further example, the parameters/values may pertain to bandwidth, packet loss, delay, delivery, latency, throughput, a category for a class-of-service (e.g., best effort, real-time, etc.), and so forth.

According to yet another exemplary implementation, network device 125 may determine whether packet loss is permitted or not based on parameters/values included in request 403. For example, request 403 may include data indicating a requested CIR, PIR, and/or other parameters/values pertaining to QoS, network performance, CoS, and so forth.

According to still other exemplary implementations, network device 125 may make other determinations that correlate to whether packet loss is permitted or not based on other criteria, such as whether or not statistical multiplexing is to be provided.

Referring to FIG. 4B, according to one exemplary scenario, when network device 125 determines that packet loss is permitted and/or the amount of packet loss permitted, network device 125 may calculate resource allocation 410. For example, network device 125 may calculate a total number of vCPUs for each traffic flow based on exemplary expressions (9)-(11), as previously described. As a part of the calculation process, network device 125 may identify various traffic metrics 414 (e.g., CIR, PR, CBS, EBS, etc.) associated with a traffic flow to and/or from network device 125 and other parameters/values included in expressions (9)-(11). Additionally, network device 125 may calculate a total number of vCPUs for an aggregate traffic flow based on exemplary expression (8), and buffer memory allocation based on exemplary expressions (4) and (6).

Referring to FIG. 4C, according to another exemplary scenario, when network device 125 determines that packet loss is not permitted, network device 125 may calculate resource allocation 417. For example, network device 125 may calculate a total number of vCPUs for each traffic flow based on exemplary expression (7), as previously described. As a part of the calculation process, network device 125 may identify various traffic metrics 420 (e.g., CIR, PR, CBS, EBS, etc.) associated with a traffic flow to and/or from network device 125 and other parameters/values included in expression (7). Additionally, network device 125 may calculate a total number of vCPUs for an aggregate traffic flow based on exemplary expression (8), and buffer memory allocation based on exemplary expressions (2), (4), and (6).

Referring to FIG. 4D, according to either scenario, network device 125 may create a VNF based on the calculated resource allocation 423. For example, network device 125 may create a VNF/VM/Container 207 in response to the request of end device 180. The VNF/VM/Container 207 of network device 125 may provide a service/application 425 that is responsive to the request of end device 180 that includes an application/service traffic flow 427 between network device 125 and end device 180. The application/service traffic flow 427 may be a part of an aggregate flow associated with network device 125.

Although FIGS. 4A-4D illustrate an exemplary process of the resource allocation service, according to other exemplary embodiments, the process may include additional, different, and/or fewer steps.

FIGS. 5A-5D are diagrams illustrating an exemplary process of the resource allocation service from an end device-side perspective. Referring to FIG. 5A, assume that end device 180 and network device 125 establish a connection. Subsequent to the establishment of the connection, end device 180 may transmit a request 503 to establish a session for an application and/or service offered by network device 125. For example, the application or service may pertain to a video streaming service, a voice service, a critical application, or some other type application/service. Before, during, or after the transmission of the request 503, end device 180 may determine whether packet loss is permitted or not, and the level of packet loss 507 with respect to the application/service requested. For example, when it is determined that packet loss is permitted, end device 180 may determine the amount of packet loss permitted.

According to various exemplary embodiments, end device 180 may make this determination based on one or multiple criteria. For example, according to an exemplary implementation, end device 180 may determine whether packet loss is permitted or not based on the type of application or service requested. According to another exemplary implementation, end device 180 may determine whether packet loss is permitted or not based on parameters of an SLA associated with end device 180. For example, the parameters/values may pertain to quality-of-service (QoS), network performance metrics, and/or a Class of Service (CoS).

Referring to FIG. 5B, according to one exemplary scenario, when end device 180 determines that packet loss is permitted and/or the amount of packet loss permitted, end device 180 may calculate resource allocation 510. For example, end device 180 may calculate a total number of vCPUs for each traffic flow based on exemplary expressions (9)-(11), as previously described. As a part of the calculation process, end device 180 may identify various traffic metrics 514 (e.g., CIR, PR, CBS, EBS, etc.) associated with a traffic flow to and/or from end device 180 and other parameters/values included in expressions (9)-(11). Additionally, end device 180 may calculate a total number of vCPUs for an aggregate traffic flow based on exemplary expression (8), and buffer memory allocation based on exemplary expressions (2), (4), and (6).

Referring to FIG. 5C, according to another exemplary scenario, when end device 180 determines that packet loss is not permitted, end device 180 may calculate resource allocation 517. For example, end device 180—may calculate a total number of vCPUs for each traffic flow based on exemplary expression (7), as previously described. As a part of the calculation process, end device 180 may identify various traffic metrics 520 (e.g., CIR, PR, CBS, EBS, etc.) associated with a traffic flow to and/or from end device 180 and other parameters/values included in expression (7). Additionally, end device 180 may calculate a total number of vCPUs for an aggregate traffic flow based on exemplary expression (8), and buffer memory allocation based on exemplary expressions (2), (4), and (6).

Referring to FIG. 5D, according to either scenario, end device 180 may create a VNF based on the calculated resource allocation 523. For example, end device 180 may create a VNF/VM/Container 307. The VNF/VM/Container 307 of end device 180 may provide a service/application 525 that includes an application/service traffic flow 527 between end device 180 and network device 125. The application/service traffic flow 527 may be a part of an aggregate flow associated with end device 180.

Although FIGS. 5A-5D illustrate an exemplary process of the resource allocation service, according to other exemplary embodiments, the process may include additional, different, and/or fewer steps.

Figure 6:
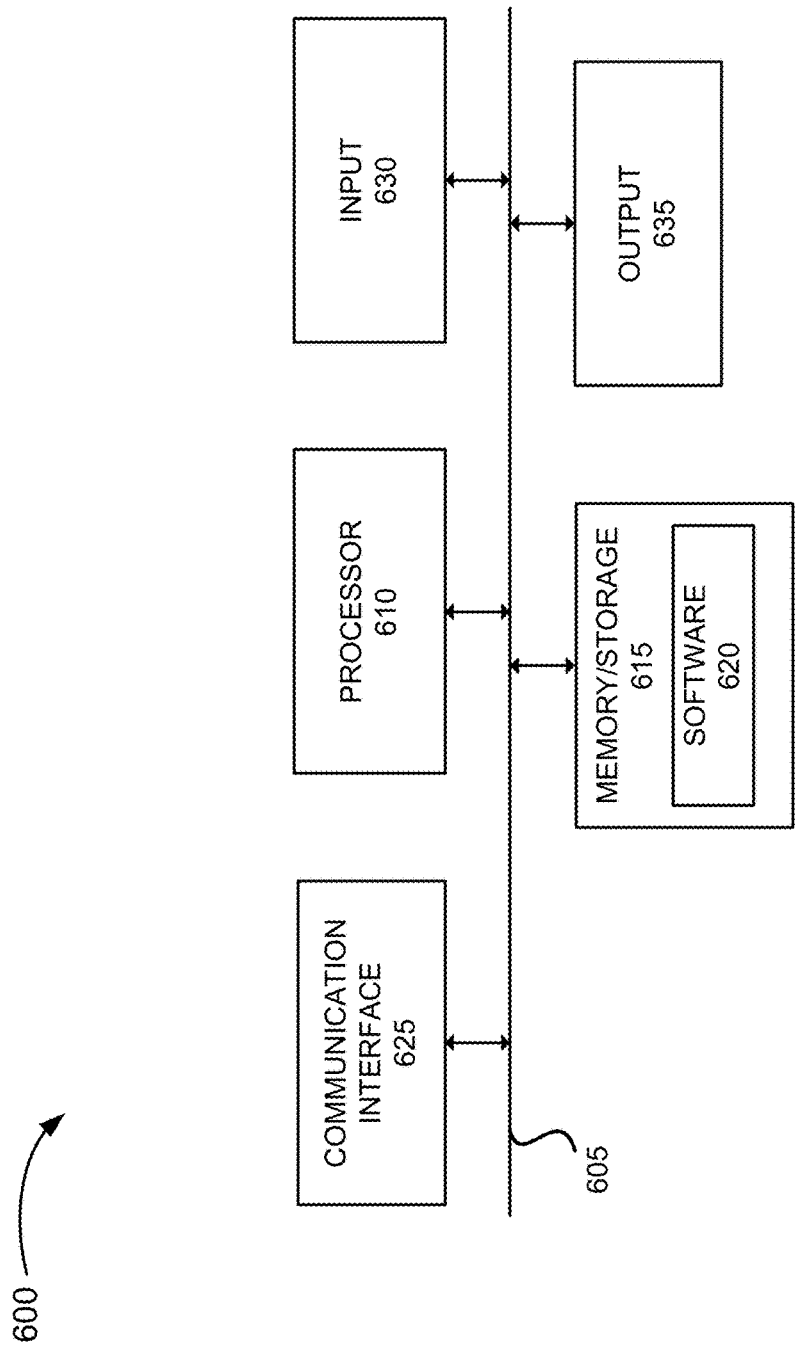
FIG. 6 is a diagram illustrating exemplary components of a device that may correspond to one or more of the devices illustrated and described herein.

FIG. 6 is a diagram illustrating exemplary components of a device 600 that may be included in one or more of the devices described herein. For example, device 600 may correspond to components included in network devices of access network 105, network devices in core network 115, a network device in network 120, and end device 180. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc. Processor 610 may also be implemented as a multiprocessor system.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to network device 125 and resource allocator 202, software 620 may include an application that, when executed by processor 610, provides the functions of the resource allocation service, as described herein. Additionally, with reference to end device 180 and resource allocator 302, software 620 may include an application that, when executed by processor 610, provides the functions of the resource allocation service, as described herein. Software 620 may also include firmware, middleware, microcode, hardware description language (HDL), and/or other form of instruction. Software 620 may further include an operating system (OS) (e.g., Windows, Linux, OpenStack, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service based interface, etc.

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a device may be implemented according to various computing architectures (e.g., in a cloud, etc.) and according to various network architectures (e.g., a virtualized function, etc.). Device 600 may be implemented in the same manner. For example, device 600 may be instantiated, spun up, spun down, etc., using well-known virtualization techniques in a public/private cloud or other type of framework/architecture.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
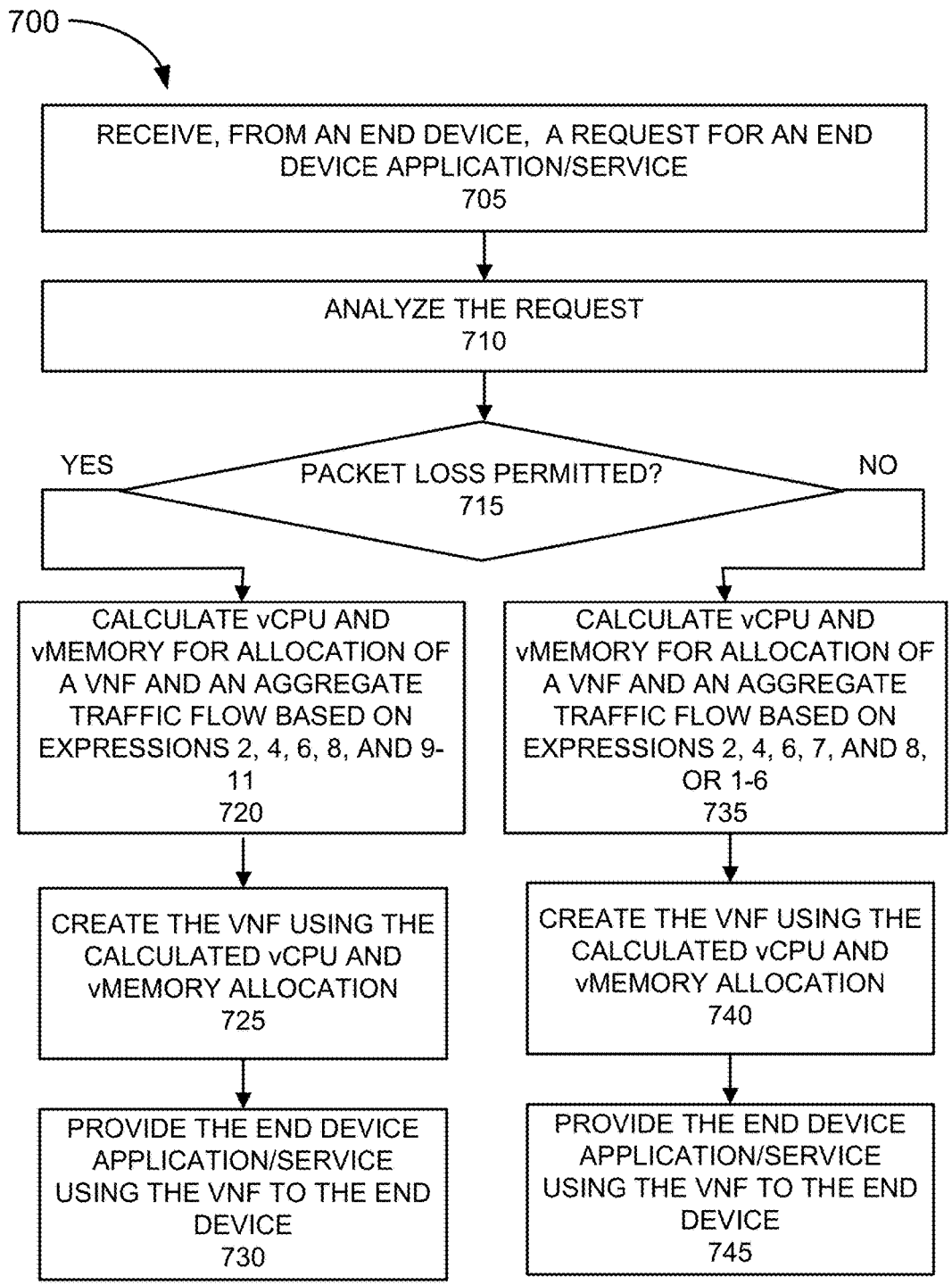
FIG. 7 is a flow diagram illustrating an exemplary process of an exemplary embodiment of the resource allocation service.

FIG. 7 is a flow diagram illustrating an exemplary process 700 of an exemplary embodiment of the resource allocation service. According to an exemplary embodiment, resource allocator 202 of network device 125 performs steps of process 700. For example, processor 610 executes software 620 to perform the steps illustrated in FIG. 7, and described herein.

Referring to FIG. 7, in block 705, a network device may receive a request, from an end device, for an end device application/service. For example, network device 125 may offer an end device application/service (e.g., VoIP, video streaming, a health service, etc.) to end devices 180. Network device 125 may receive a request from end device 180 for the end device application/service.

In block 710, the request may be analyzed. For example, network device 125 may identify the type of end device/application service request based on data included in the request. Additionally, or alternatively, network device 125 may identify other data included in the request, such as, for example, a requested CIR, PR, QoS, CoS, and/or types of data that influence the configuration and provisioning of the application/service to be provided.

In block 715, it may be determined whether packet loss is permitted or not. For example, network device 125 may determine whether packet loss is permitted or not with respect to the received request based on the analysis. As previously described, according to various exemplary embodiments, network device 125 may make this determination based on or multiple criteria. For example, network device 125 may make this determination based on the type of application/service requested, parameters of an SLA associated with end device, parameters/values included in the request, multiplexing, and/or other administratively configurable criterion.

When it is determined that packet loss is permitted (block 715—YES), the vCPU and Memory for allocation of a virtual device (e.g., VNF/VM, VNF/Container, etc.) and an aggregate traffic flow may be calculated based on expressions (2), (4), (6), (8), and (9)-(11) (block 720). For example, network device 125 may calculate a number of vCPUs for each traffic flow based on a memory size to handle a traffic load at a peak rate, and a packet loss ratio that is allowed per a service level agreement. Network device 125 may calculate a total number of vCPUs for an aggregate flow based on the calculations of the number of vCPUs for each traffic flow, and a buffer memory size for each traffic flow and an aggregate traffic flow, as previously described.

In block 725, the VNF/VM may be created using the calculated vCPU and memory allocation. For example, network device 125 may create the virtual device (e.g., VNF/VM, VNF/Container, etc.) which provides the requested end device application service, using the allocated resources (e.g., physical, virtual, logical, vCPU, Memory, etc.). By way of further example, virtualization logic (e.g., controller 204 and hypervisor 212) may create the virtual device based on the resources allocated.

In block 730, the end device application/service may be provided by the network device. For example, the virtual device (e.g., VNF/VM, VNF/Container, etc.) may provide the end device application service to end device 180, in which end device application/service data may be transmitted to end device 180 and/or end device application/service data may be received from end device 180.

When it is determined that packet loss is not permitted (block 715—NO), the vCPU and Memory for allocation of a virtual device (e.g., VNF/VM, VNF/Container, etc.) and an aggregate traffic flow may be calculated based on expressions (2), (4), (6), (7), and (8) or expressions (1)-(6) (block 735). For example, with reference to expressions (2), (4), (6), (7), and (8), network device 125 may calculate a number of vCPUs for each traffic flow based on a memory size for a traffic flow in each direction, and a memory size to handle a traffic load at a peak rate. Network device 125 may calculate a total number of vCPUs for an aggregate flow based on the calculations of the number of vCPUs for each traffic flow, and a buffer memory size for each traffic flow and an aggregate traffic flow, as previously described. Alternatively, network device 125 may calculate a total number of vCPUs and total amount of memory for an aggregate flow based on expressions (1)-(6), as previously described.

In block 740, the VNF/VM may be created using the calculated vCPU and Memory allocation. For example, network device 125 may create the virtual device (e.g., VNF/VM, VNF/Container, etc.), which provides the requested end device application service, using the allocated resources (e.g., physical, virtual, logical, vCPU, Memory, etc.). By way of further example, virtualization logic (e.g., controller 204 and hypervisor 212) may create the virtual device based on the resources allocated.

In block 745, the end device application/service may be provided by the network device. For example, the virtual device (e.g., VNF/VM, VNF/Container, etc.) may provide the end device application service to end device 180, in which end device application/service data may be transmitted to end device 180 and/or end device application/service data may be received from end device 180.

Although FIG. 7 illustrates an exemplary process 700 of the resource allocation service, according to other embodiments, process 700 may include additional operations, fewer operations, and/or different operations than those illustrated in FIG. 7, and described herein. For example, while process 700 has been described in relation to network device 125, end device 180 may perform a similar process, as previously described.

Figure 8:
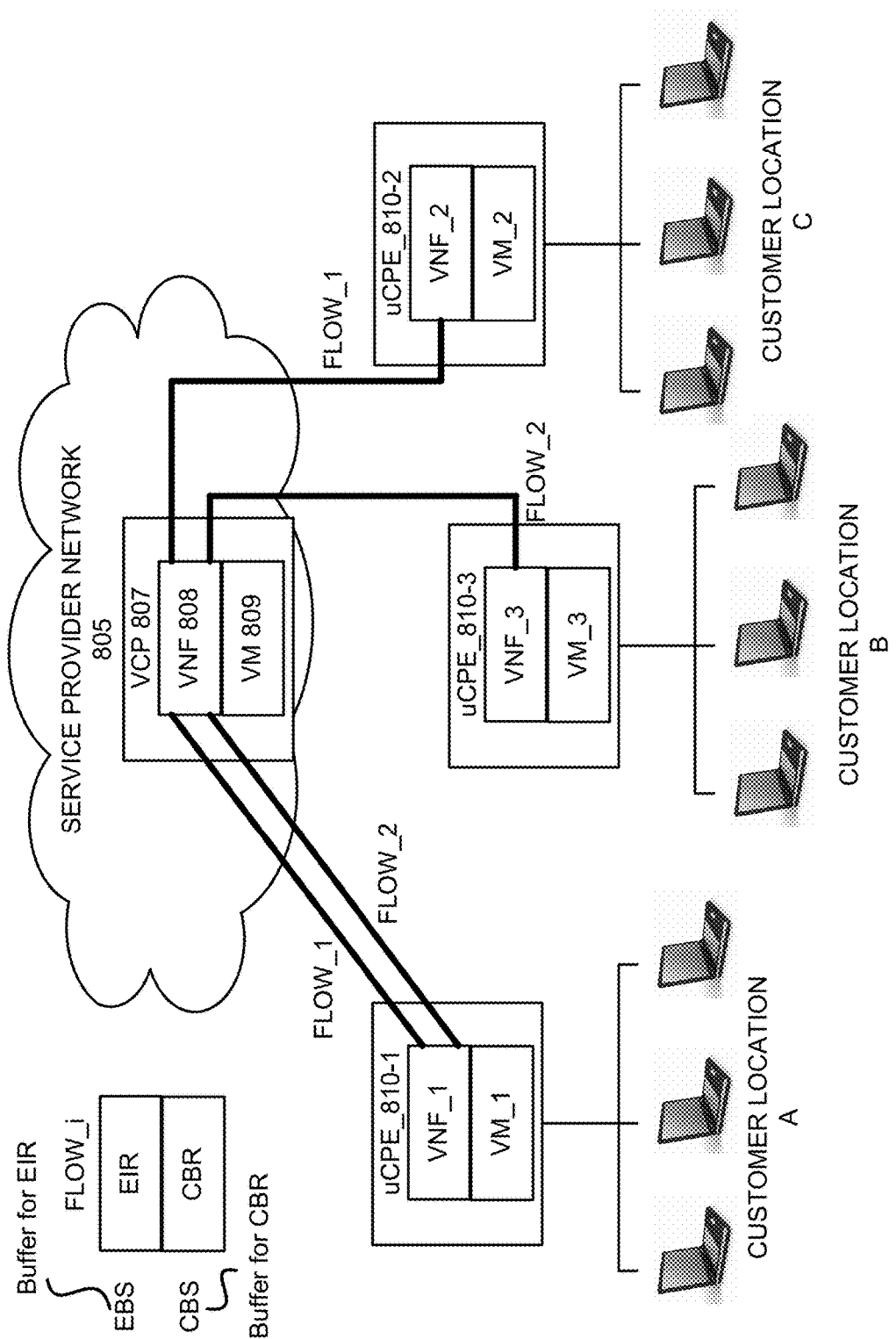
FIG. 8 is a diagram of an exemplary scenario in which an exemplary embodiment of the resource allocation service may be implemented.

FIG. 8 is a diagram of an exemplary scenario in which an exemplary embodiment of the resource allocation service may be implemented. As illustrated, a customer location A may include a uCPE 810-1, which further includes a VNF_1 and a VM_1; a customer location B may include a uCPE 810-3, which further includes a VNF_3 and a VM_3; and a customer location C may include a uCPE 810-2, which further includes a VNF_2 and a VM_2. uCPEs 810-1, 810-2, and 810-3 may each be configured to provide the resource allocation service, as described herein. As further illustrated, a service provider network 805 may include a VCP 807, which further includes a VNF 808 and a VM 809. Similarly, VCP 807 may provide the resource allocation service, as described herein.

According to an exemplary scenario, assume that uCPE 810-1, at customer location A, has different flows to transmit (and/or receive), such as a Flow_1 and a Flow_2, as illustrated, via VCP 807 of service provider network 805. According to this example, uCPE 810_1 may determine that each traffic flow permits a packet loss based on each application pertaining to each traffic flow. Additionally, uCPE 810-1 may identify the packet loss ratio for each traffic flow based on configuration information that includes a packet loss ratio afforded by a service level agreement. uCPE 810-1 may allocate resources (e.g., processor, memory, vCPU, Memory, etc.) in support of VNF_1 and VM_1 for an aggregate flow based on exemplary expressions (2), (4), (6), (8), and (9)-(11), as previously described. In a similar manner, VCP 807, uCPE 810-2, and uCPE 810-3 may also allocate resources in support of VNFs/VMs.

The resource allocation service may minimize resource utilization. The exemplary expressions of (1)-(6) may be used when packet loss is not permitted. Additionally, exemplary expressions (2), (4), (6), (7), and (8) may be used when packet loss is not permitted. Further, exemplary expressions (2), (4), (6), (8), and (9)-(11) may be used when packet loss is permitted.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, by a network device from an end device, a request for an application or a service;
   analyzing, by the network device in response to the receiving, the request;
   determining, by the network device in response to the analyzing, whether a packet loss is permitted with respect to servicing the request;
   calculating, by the network device in response to determining that the packet loss is permitted, a first allocation of a processor and a buffer memory pertaining to a first virtual network function or a first virtual machine that will provide the application or the service, wherein the first allocation of the processor is calculated based on a buffer memory size of the buffer memory pertaining to a traffic load at a peak rate and a packet loss ratio;

calculating, by the network device in response to determining that the packet loss is not permitted, a second allocation of the processor and a buffer memory pertaining to a second virtual network function or a second virtual machine that will provide the application or the service, wherein the second allocation of the processor is calculated based on a buffer memory size of the buffer memory pertaining to a traffic load at a peak rate;

creating, by the network device in response to the calculating of the first allocation, the first virtual function or the first virtual machine based on the first allocation;

creating, by the network device in response to the calculating of the second allocation, the second virtual function or the second virtual machine based on the second allocation;

providing, by the first virtual function or the first virtual machine of the network device, the application or the service to the end device; and providing, by the second virtual function or the second virtual machine of the network device, the application or the service to the end device.

2. The method of claim 1, wherein the calculating in response to determining that the packet loss is not permitted further comprises:

calculating, by the network device, a committed number of virtual processors of the processor for each traffic flow of an aggregate traffic flow;

calculating, by the network device, an excess number of virtual processors of the processor for each traffic flow of the aggregate flow;

calculating, by the network device, a buffer memory size of a buffer memory for each inbound traffic flow of the aggregate flow; and calculating, by the network device, a buffer memory size of a buffer memory for each outbound traffic flow of the aggregate flow.

3. The method of claim 2, further comprising:

calculating, by the network device, a total number of virtual processors of the processor for the aggregate traffic flow based on a summation of the committed number of virtual processors for each traffic flow and the excess number of virtual processors for each traffic flow; and calculating, by the network device, a total memory size of a buffer memory for the aggregate flow based on a summation of a committed memory size for each traffic flow and an excess memory size for each traffic flow.

4. The method of claim 3, wherein the committed number of virtual processors and the committed memory size are physical resources that support a committed information rate and a constant burst size, and the excess number of virtual processors and the excess memory size are physical resources that support an information rate between the committed information rate and a peak information rate, and an excessive burst size.

5. The method of claim 1, wherein the calculating in response to determining that the packet loss is permitted further comprises:

calculating, by the network device, a committed number of virtual processors of the processor for each traffic flow of an aggregate traffic flow;

calculating, by the network device, an excess number of virtual processors of the processor for each traffic flow of the aggregate flow;

calculating, by the network device, a maximum number of virtual processors for each traffic flow of the aggregate flow based on a summation of the committed number of virtual processors and the excess number of virtual processors; and calculating, by the network device, a ratio between the buffer memory size of the buffer memory pertaining to the traffic load at the peak rate and a maximum number of virtual processors of the processor, wherein the maximum number of virtual processors of the processor is a summation of the committed number and the excess number of virtual processors of the processor.

6. The method of claim 5, wherein the calculating the first allocation of the processor, the method further comprises:

identifying, by the network device, a packet loss ratio that is allowed per a service level agreement associated with the end device; and calculating, by the network device, a natural log of the packet loss ratio.

7. The method of claim 1, wherein the determining further comprises:

determining, by the network device, whether the packet loss is permitted is based on at least one of a type of the application or the service requested, a parameter associated with a service level agreement pertaining to the end device, or a parameter and parameter value included in the request.

8. The method of claim 1, wherein the first allocation and the second allocation each support an aggregate traffic flow of the application or the service, wherein the aggregate traffic flow includes an inbound traffic flow and an outbound traffic flow.

9. A network device comprising:

a communication interface;

a memory, wherein the memory stores instructions; and a processor, wherein the processor executes the instructions to:

receive, via the communication interface from an end device, a request for an application or a service;

analyze, in response to the receipt, the request;

determine, in response to the analysis, whether a packet loss is permitted with respect to servicing the request;

calculate, in response to a determination that the packet loss is permitted, a first allocation of a first processor and a first buffer memory pertaining to a first virtual network function or a first virtual machine that will provide the application or the service, wherein the first allocation of the first processor is calculated based on a buffer memory size of the first buffer memory pertaining to a traffic load at a peak rate and a packet loss ratio;

calculate, in response to a determination that the packet loss is not permitted, a second allocation of the first processor and the first buffer memory pertaining to a second virtual network function or a second virtual machine that will provide the application or the service, wherein the second allocation of the first processor is calculated based on a buffer memory size of the first buffer memory pertaining to a traffic load at a peak rate;

create, in response to the calculation of the first allocation, the first virtual function or the first virtual machine based on the first allocation;

creating, in response to the calculation of the second allocation, the second virtual function or the second virtual machine based on the second allocation;

provide, by the first virtual function or the first virtual machine of the network device, the application or the service to the end device; and provide, by the second virtual function or the second virtual machine of the network device, the application or the service to the end device.

10. The network device of claim 9, wherein, when calculating in response to the determination that the packet loss is not permitted, the processor further executes the instructions to:

calculate a committed number of virtual processors of the first processor for each traffic flow of an aggregate traffic flow;

calculate an excess number of virtual processors of the first processor for each traffic flow of the aggregate flow;

calculate a buffer memory size of a buffer memory for each inbound traffic flow of the aggregate flow; and calculate a buffer memory size of a buffer memory for each outbound traffic flow of the aggregate flow.

11. The network device of claim 10, wherein the processor further executes the instructions to:

calculate a total number of virtual processors of the first processor for the aggregate traffic flow based on a summation of the committed number of virtual processors for each traffic flow and the excess number of virtual processors for each traffic flow; and calculate a total memory size of the first buffer memory for the aggregate flow based on a summation of a committed memory size for each traffic flow and an excess memory size for each traffic flow.

12. The network device of claim 11, wherein the committed number of virtual processors and the committed memory size are physical resources that support a committed information rate and a constant burst size, and the excess number of virtual processors and the excess memory size are physical resources that support an information rate between the committed information rate and a peak information rate, and an excessive burst size.

13. The network device of claim 9, wherein, when calculating in response to the determination that the packet loss is permitted, the processor further executes the instructions to:

calculate a committed number of virtual processors of the first processor for each traffic flow of an aggregate traffic flow;

calculate an excess number of virtual processors of the first processor for each traffic flow of the aggregate flow;

calculate a maximum number of virtual processors for each traffic flow of the aggregate flow based on a summation of the committed number of virtual processors and the excess number of virtual processors; and calculate a ratio between the buffer memory size of the first buffer memory pertaining to the traffic load at the peak rate and a maximum number of virtual processors of the first processor, wherein the maximum number of virtual processors of the first processor is a summation of the committed number and the excess number of virtual processors of the first processor.

14. The network device of claim 13, wherein, when calculating the first allocation of the first processor, the processor further executes the instructions to:

identify a packet loss ratio that is allowed per a service level agreement associated with the end device; and calculate a natural log of the packet loss ratio.

15. The network device of claim 9, wherein, when determining, the processor further executes the instructions to:

determine whether the packet loss is permitted is based on at least one of a type of the application or the service requested, a parameter associated with a service level agreement pertaining to the end device, or a parameter and parameter value included in the request, and wherein the first allocation and the second allocation each support an aggregate traffic flow of the application or the service, wherein the aggregate traffic flow includes an inbound traffic flow and an outbound traffic flow.

16. A non-transitory computer-readable storage medium storing instructions executable by a processor of a device, which when executed cause the device to:

receive, from an end device, a request for an application or a service;

analyze, in response to the receipt, the request;

determine, in response to the analysis, whether a packet loss is permitted with respect to servicing the request;

calculate, in response to a determination that the packet loss is permitted, a first allocation of a first processor and a first buffer memory pertaining to a first virtual network function or a first virtual machine that will provide the application or the service, wherein the first allocation of the first processor is calculated based on a buffer memory size of the first buffer memory pertaining to a traffic load at a peak rate and a packet loss ratio;

calculate, in response to a determination that the packet loss is not permitted, a second allocation of the first processor and the first buffer memory pertaining to a second virtual network function or a second virtual machine that will provide the application or the service, wherein the second allocation of the first processor is calculated based on a buffer memory size of the first buffer memory pertaining to a traffic load at a peak rate;

create, in response to the calculation of the first allocation, the first virtual function or the first virtual machine based on the first allocation;

creating, in response to the calculation of the second allocation, the second virtual function or the second virtual machine based on the second allocation;

provide, by the first virtual function or the first virtual machine of the device, the application or the service to the end device; and provide, by the second virtual function or the second virtual machine of the device, the application or the service to the end device.

17. The non-transitory computer-readable storage medium of claim 16, wherein the instructions to calculate in response to the determination that the packet loss is not permitted, further include instructions executable by the processor of the device, which when executed cause the device to:

calculate a committed number of virtual processors of the first processor for each traffic flow of an aggregate traffic flow;

calculate an excess number of virtual processors of the first processor for each traffic flow of the aggregate flow;

calculate a buffer memory size of a buffer memory for each inbound traffic flow of the aggregate flow; and calculate a buffer memory size of a buffer memory for each outbound traffic flow of the aggregate flow.

18. The non-transitory computer-readable storage medium of claim 17, wherein the instructions further include instructions executable by the processor of the device, which when executed cause the device to:

calculate a total number of virtual processors of the first processor for the aggregate traffic flow based on a summation of the committed number of virtual processors for each traffic flow and the excess number of virtual processors for each traffic flow; and calculate a total memory size of the first buffer memory for the aggregate flow based on a summation of a committed memory size for each traffic flow and an excess memory size for each traffic flow.

19. The non-transitory computer-readable storage medium of claim 17, wherein the instructions to calculate in response to the determination that the packet loss is permitted, further include instructions executable by the processor of the device, which when executed cause the device to:

calculate a committed number of virtual processors of the first processor for each traffic flow of an aggregate traffic flow;

calculate an excess number of virtual processors of the first processor for each traffic flow of the aggregate flow;

calculate a maximum number of virtual processors for each traffic flow of the aggregate flow based on a summation of the committed number of virtual processors and the excess number of virtual processors; and calculate a ratio between the buffer memory size of the first buffer memory pertaining to the traffic load at the peak rate and a maximum number of virtual processors of the first processor, wherein the maximum number of virtual processors of the first processor is a summation of the committed number and the excess number of virtual processors of the first processor.

20. The non-transitory computer-readable storage medium of claim 19, wherein the instructions to calculate the first allocation of the first processor, further include instructions executable by the processor of the device, which when executed cause the device to:

identify a packet loss ratio that is allowed per a service level agreement associated with the end device; and calculate a natural log of the packet loss ratio.

\* \* \* \* \*